(12) United States Patent
Weiss (10) Patent No.: US 10,005,648 B2
(45) Date of Patent: Jun. 26, 2018

(54) METHOD OF RADIO COMMUNICATION BETWEEN COLUMNS OF A LIFT AND ASSOCIATED LIFT

(71) Applicant: SEFAC, Montherme (FR)

(72) Inventor: Daniel Weiss, Thionville, FL (US)

(73) Assignee: SEFAC, Montherme (FR)

( * ) Notice: Subject to any disclaimer, the term of this patent is extended or adjusted under 35 U.S.C. 154(b) by 82 days.

(21) Appl. No.: 15/029,611

(22) PCT Filed: Oct. 16, 2014

(86) PCT No.: PCT/FR2014/052639
§ 371 (c)(1),
(2) Date: Apr. 14, 2016

(87) PCT Pub. No.: WO2015/055959
PCT Pub. Date: Apr. 23, 2015

(65) Prior Publication Data
US 2016/0257536 A1     Sep. 8, 2016

(30) Foreign Application Priority Data

Oct. 18, 2013  (FR) ...................................... 13 60182

(51) Int. Cl.
*H04W 24/08*   (2009.01)
*B66F 3/46*    (2006.01)
*H04W 72/04*   (2009.01)
*H04W 72/08*   (2009.01)

(52) U.S. Cl.
CPC .............. *B66F 3/46* (2013.01); *H04W 24/08* (2013.01); *H04W 72/0446* (2013.01); *H04W 72/0453* (2013.01); *H04W 72/08* (2013.01)

(58) Field of Classification Search
CPC ....... B66F 3/46; H04W 24/08; H04W 24/084; H04W 72/0446; H04W 72/0453; H04W 72/08; B66B 3/46
USPC ......................................................... 187/247
See application file for complete search history.

(56) References Cited

U.S. PATENT DOCUMENTS 5,500,691 A *  3/1996  Martin ................... G08C 17/02
                                                  348/734
5,676,385 A * 10/1997  Schneider ................. B60S 9/12
                                                  280/6.153
5,800,114 A *  9/1998  Secondi ............... B65D 90/143
                                                  280/43.23

(Continued)

*Primary Examiner* — David Warren
(74) *Attorney, Agent, or Firm* — Andrew W. Chu; Craft Chu PLLC (57) ABSTRACT

The method of radio communication between columns of a lift allows for use of a bridge consisting of at least two lifting columns and simultaneous operation of several bridges in a multichannel mode. The radio channels are selected in a pre-determined frequency band. The bridges synchronize respective columns in the course of the lifting operations and in the event of a fault in at least one column or in the event of an emergency stop. The method includes a first phase of triggering waiting and scanning, followed by a second phase of inscribing the columns for the construction of the bridge, and followed by a third phase of exploitation in the course of which each column of a constructed bridge dialogs with the others in the radio broadcasting mode, with an equal weight for all the columns.

19 Claims, 9 Drawing Sheets

(56) References Cited

U.S. PATENT DOCUMENTS

| | | | | |
|---|---|---|---|---|
| 6,193,219 B1* | 2/2001 | Belley | B66F 7/20 | 254/89 H |
| 6,315,079 B1* | 11/2001 | Berends | B66F 3/46 | 187/203 |
| 6,505,815 B1* | 1/2003 | Dellamore | B66F 7/04 | 254/2 B |
| 6,634,461 B1* | 10/2003 | Baker | B66F 3/46 | 187/210 |
| 6,763,916 B2* | 7/2004 | Green | B66F 7/20 | 187/210 |
| 6,817,449 B2* | 11/2004 | Berends | B66F 7/20 | 187/213 |
| 6,968,963 B1* | 11/2005 | Zakula, Sr. | B66C 1/28 | 212/270 |
| 6,983,196 B2* | 1/2006 | Green | B66F 7/04 | 254/45 |
| 7,191,038 B2* | 3/2007 | Green | B66F 7/04 | 254/45 |
| 7,219,770 B2* | 5/2007 | Baker | B66F 3/46 | 187/210 |
| 7,461,733 B2* | 12/2008 | Dohi | B62D 65/18 | 198/345.1 |
| 7,500,816 B2* | 3/2009 | Berends | B66F 3/46 | 187/210 |
| 7,644,807 B2* | 1/2010 | Finkbeiner | B66F 3/46 | 187/224 |
| 7,740,109 B2* | 6/2010 | Moller | B66F 3/24 | 187/210 |
| 8,028,973 B2* | 10/2011 | Ford | B66F 3/44 | 187/203 |
| 9,004,454 B1* | 4/2015 | Faure | B65D 90/0033 | 254/89 H |
| 9,611,128 B2* | 4/2017 | Van Houten | B66F 3/46 | |
| 2004/0026180 A1 | 2/2004 | Baker | | |
| 2004/0146022 A1* | 7/2004 | Lewis | G01S 7/021 | 370/331 |
| 2004/0239497 A1* | 12/2004 | Schwartzman | H04B 1/7087 | 340/539.1 |
| 2006/0102432 A1* | 5/2006 | Matsumoto | B66F 7/20 | 187/203 |
| 2006/0285959 A1* | 12/2006 | Warhurst | B60P 1/6445 | 414/540 |
| 2007/0038346 A1* | 2/2007 | Ehrlich | G07C 5/008 | 701/31.4 |
| 2009/0242333 A1* | 10/2009 | Finkbeiner | B66F 7/20 | 187/209 |
| 2010/0066278 A1* | 3/2010 | De Jong | B66F 7/16 | 318/376 |
| 2010/0128565 A1* | 5/2010 | Golparian | G01V 1/223 | 367/79 |
| 2011/0037041 A1* | 2/2011 | DeJong | B66F 3/46 | 254/89 R |
| 2011/0095533 A1* | 4/2011 | Reagan | B66B 5/027 | 290/52 |
| 2011/0097187 A1* | 4/2011 | Kelley | B66F 7/28 | 414/814 |
| 2012/0018688 A1* | 1/2012 | Finkbeiner | B66F 7/28 | 254/1 |
| 2012/0037864 A1* | 2/2012 | Finkbeiner | B66F 3/44 | 254/93 R |
| 2013/0240300 A1* | 9/2013 | Fagan | B66F 3/46 | 187/210 |
| 2013/0240812 A1* | 9/2013 | Helmich | B66F 3/46 | 254/89 H |
| 2015/0232309 A1* | 8/2015 | Jaipaul | B66F 7/04 | 414/800 |
| 2015/0246797 A1* | 9/2015 | Jaipaul | B66F 3/46 | 700/225 |
| 2016/0257536 A1* | 9/2016 | Weiss | B66F 3/46 | |

* cited by examiner

Transmission

Reception

Fig. 10

METHOD OF RADIO COMMUNICATION BETWEEN COLUMNS OF A LIFT AND ASSOCIATED LIFT

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to the field of the synchronization of a set of equipment items. It more particularly relates to a lifting system for a vehicle, for example made up of 2 to 8 independent battery-powered columns, and which must provide the synchronized lifting of the load.

2. Description of Related Art Including Information Disclosed Under 37 CFR 1.97 and 37 CFR 1.98.

The lifting order that is given on one of the columns must be sent to all of the columns making up the bridge. During the lifting phase, the speed of each column must be controlled and must be able to be adapted to perform the iso-leveling function: at each moment, each column of the bridge must be at the same level as all of the others.

Furthermore, any defect occurring on one of the columns or an activated emergency stop must stop the lifting immediately.

The operation of the bridge is based on the communication between the columns.

The exchanges include three types of transmitted information:
1. Changes in configuration and parameterization,
2. Synchronized lifting commands,
3. Faults and the emergency stop command.

Information of type 2, and above all type 3, requires rapid transmissions done in guaranteed time frames.

The decommissioning of a column must stop or prohibit all lifting operations of all of the columns in a very short length of time. This event can only be detected by an absence of the column in the communication protocol.

Several bridges must be able to be established and used in a same location and at a small distance from one another without a deterioration of performance levels.

Several lifts being able to be used in a same location, they must share a wireless environment without disturbing one another and without performance deterioration. Only a multichannel system makes it possible to provide a dedicated environment for each bridge.

The user must be able to form a bridge by taking available columns in the workshop. The allocation of radio channels must be done automatically and transparently for the user.

The emergency stop information of the system must allow the rapid stop of all of the columns of a bridge. This information must be sent as a matter of priority and within a maximum time frame on the radio network.

The standard protocols access the media in "beaconless" mode using the CSMA method, which defers the transmission if the channel is occupied. In these protocols, access to the media is done in an undetermined manner.

In beacon mode, time interval "slots" are created by the coordinator and access to the media is then deterministic for the "slave" equipment.

Document US 2004/0026180 discloses a solution for synchronizing several columns by wireless communication, using a protocol of the master/slave type.

This operation is not admissible in the operating phase, since the protocol is dependent on a column, that of the coordinator, which is the "master". The failure of the coordinator blocks the exchanges, and it becomes impossible to stop the "slaves". Document US 2013/240300 also discloses a method based on a column ensuring the coordination, working in practice with a master-slave logic that leads to the aforementioned limitation.

The failure of one column should not prevent exchanges between the remaining columns.

Furthermore, if the channels are all occupied, it is desirable to be able to reuse a channel that has already been used if the bridges are far enough apart. In order to optimize this mechanism, the columns must use just the necessary transmission power in order to minimize the range to allow the reuse of the channel if necessary.

The frequencies and the protocol used must preferably be authorized over all continents.

The standard radio protocols, such as ZigBee, XBee, WLAN, WiFi, MiWi, Bluetooth, etc. do not meet the needs listed in the preceding paragraph. The biggest problem with these protocols is that they use carrier detection (CSMA) in beaconless mode as the access method to the media and therefore do not allow deterministic access to the radio channel.

Furthermore, these protocols are designed to meet most needs and are, for industrial standards like ZigBee, adapted to information collection on mesh networks, favoring the conveyance by routing mechanisms relative to real-time aspects.

BRIEF SUMMARY OF THE INVENTION

The present invention aims to offset at least some of these drawbacks. To that end, it proposes a radio communication method between columns of a lift to establish and operate a bridge made up of at least two lifting columns selected in an environment including a plurality of columns able to be used for the formation and simultaneous operation of several bridges in multichannel mode, the radio channels being selected in a predetermined frequency band, the operation of the bridges thus formed aiming to synchronize the columns during the lifting operations and in case of fault in one of the columns or in case of emergency stop. This method is particular in that it includes three distinct phases:

upon powering on, the columns scan the transmissions of the radio channels in order to detect their availability and their scrambling level by outside transmissions;

a column selected first for establishing a bridge, by assignment of an entry key by the operator and corresponding to a single bridge, selects a free channel, creates a beacon channel there and manages it in broadcasting mode, allowing the registration of at least one other column N to which the same key has been given, each column N (N≥2) fitting in the first available time slot of the beacon channel, all of the columns having the same key being able to close the registration, the bridge then being formed;

each column of a formed bridge dialogues with the others in the broadcasting mode during the operation of said bridge, the synchronization of the transmissions of the frames containing the data being done while keeping the time slots occupied during the registration, with an equal weight for all of the columns.

Owing to these arrangements, the risk of unidentified failure becomes significantly lower.

Furthermore, the chosen frequency band is comprised between 2.4 and 2.5 GHz including a plurality of authorized slots, numbered in a manner that will be explained in more detail below.

In reality, the communication protocol according to the present invention is based on the 7 layer OSI model, the transport 4, session 5 and presentation 6 layers in the case at hand being grouped together in a single presentation layer between the network 3 and application 7 layers, said single layer shaping the data for the management of the columns.

Still more specifically, the control sublayer of the logic link of the data link layer 2 comprises three modules active separately, respectively corresponding to the phases for channel scanning, registration for establishment of the bridge, and operation of an established bridge.

The first module, active during the channel scanning phase once a column is powered on, performs a measurement of the receiving power of the signals received from each channel, identifies the frames sent on each channel and fills in a channel state table. This channel state table stores data on:

the possibility of using each channel based on the local regulation, the stored information corresponding to: authorized or prohibited;

the type of transmitted frame, the stored information corresponding to: registration frame or operation frame of the bridge;

the serial number of the key assigned to each bridge on each channel;

the serial number of the columns; and the occupancy rate of each channel, in the form of a percentage calculated after several tens of measurements.

The second module, activated by the network layer 3 during the column registration phase in order to establish a bridge, deactivates the first module and seeks to determine whether channel is in the registration phase with the same key, in order to rejoin that channel to record the column if so, or to choose the channel having the lowest occupancy rate to create a beacon channel therein starting a registration procedure. This is in fact based on a protocol called time division multiple access (TDMA), and includes time slots with a predetermined duration usable as follows:

the column that starts the registration procedure assigns itself the number 0, the columns next presenting themselves on the channel assigning themselves the following numbers by arrival order and inserting their data into the time slots corresponding to their order number, the number of the available slot appearing in the data field of column 0;

the columns insert their presence frames cyclically upon each launch of the time slots by column 0, said frames being escalated to the network layer 3.

According to the invention, the disappearance of the presence frame of a column for N consecutive cycles is treated as the deregistration of the column and the release of the corresponding time slot. Likewise, the absence of transmission by a column 0 for a duration of N cycles causes the elimination of the bridge and the deregistration of all of the columns of that bridge, then the release of the corresponding channel and the escalation of the information to the network layer 3, which gives control back to the second module.

In the method according to the invention, each presence frame includes the code for the registration phase, the number of the transmitting column, the number of the key assigned to the bridge, the serial number of column 0, the number of columns recorded and the table of quality indicators containing data on the power and receiving quality of the signals received from the other columns, respectively.

The third module, activated by the network layer 3 when the column is selected using the key identifying a bridge, deactivates the second module and manages the columns on a time division multiple access (T-TDMA) basis with a "token" implying the passage of control from one column of the bridge to the other upon each cycle. All of the columns manage the durations of the time slots in order to respect the length of the cycle even if the operating data frame of a column is not received, the assignments of time slots and their durations being preserved. The unused slots are deleted.

In case of failure by column N, column N+1 goes to transmission mode upon expiration of the duration of the time slot that was assigned to it.

According to one possible configuration, each operating data frame includes the code for the registration phase, the number of the transmitting column, the number of the key assigned to the bridge, the serial number of the column 0, the number of registered columns, the table of quality indicators, and operational data to operate the particular application, i.e., the lift.

In the invention, the network layer 3 of each column stores the table of quality indicators of the received frames and calculates a global quality index GQI of the reception and a quality indicator GQI of the reception of its frames as perceived by the other columns. This network layer 3 also calculates the transmission power in order to obtain a determined level by the lowest of the quality indicators GQI.

The sole single presentation layer 4 sends/receives the following information to/from the application layer 7:

A byte indicating the state/activation of the column, which may assume the values: inactive/stop, scanning/ scanning command, registration/registration command, operation/operation command, and radio failure (for reception only);

The global quality indicator GQI, coded between 0 and 4 (maximum quality); and

The length and data of each frame.

According to one possibility chosen in the context of the method according to the invention, the time slots last 1.5 ms, the duration of the frames being no more than 1 ms.

Lastly, the invention also relates to a lift, in particular for lifting vehicles, including at least two lifting columns and radio communication means between columns operating according to the radio communication method developed above.

The advantage provided by the present invention primarily lies in the fact that the method is completely deterministic, and any failure in any one of the columns is perceived and managed by the others in a quasi-certain manner.

BRIEF DESCRIPTION OF THE SEVERAL VIEWS OF THE DRAWINGS

The present invention will be better understood upon reading the following detailed description done in reference to the appended figures.

DETAILED DESCRIPTION OF THE INVENTION

Figure 1:
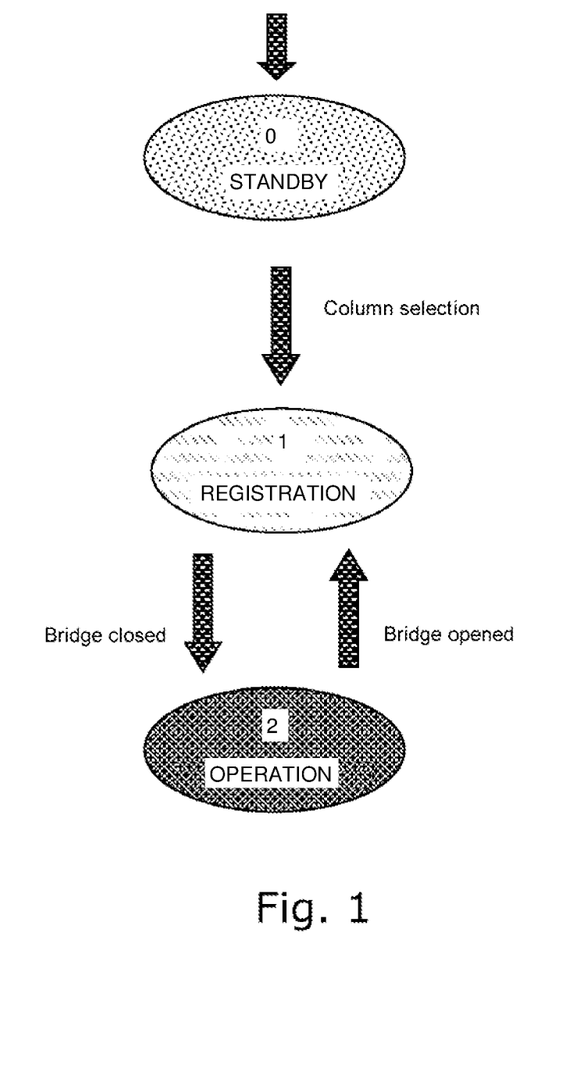
FIG. 1 is a diagrammatic illustration of a diagram showing the states of a column.

FIG. 1 shows the states of a column from powering on to operation.

After powering on, the column is in standby awaiting selection to form a bridge.

The closing of the bridge closes the registration phase for the columns of the bridge. The bridge is then complete with all of the selected columns.

The operating phase corresponds to the use of the bridge to perform lifting operations.

The opening of the bridge no longer allows the use of the bridge, but it becomes possible to reform a new bridge to eliminate, change or add a column.

The protocol also comprises three completely separate phases:

Phase 0=Radio channel monitoring phase:

During this phase, the available columns monitor all of the radio channels in order to detect the free channels, the channels already occupied by a bridge and the channels scrambled by outside transmissions.

This phase is silent. The columns do not enter transmission mode, they merely listen and assess the availability and quality of all of the radio channels.

Phase 1=Phase for establishing the bridge:

During this phase, the first selected column chooses the free channel having the lowest noise level. It then creates a "beacon" channel on this channel and manages it, in order to allow the registration of other columns in this bridge. Each column submits its registration request in the first free slot of the beacon channel. The manager of the "beacon" channel authorizes and records the registration of the columns. The slots are assigned in the arrival order of the columns.

Phase 2=Operating phase of the bridge:

When all of the columns are present on the operational channel, any column can close the bridge. It sends the closing order to all of the other columns, which in turn confirm the transition to the operating phase.

In order to optimize the transmission times, all of the transmissions are heard simultaneously by all of the columns of the bridge and are done in "broadcast" mode.

The synchronization of the transmissions by the slots, created in the registration phase, is maintained during this operation phase. The notion of manager disappears and all of the columns have the same weight in the dialogue. However, the empty slots, which existed to receive the new columns in the registration phase, are eliminated.

The protocol according to the invention has been developed in accordance with the OSI model under standard ISO 7498, globally titled "Open Systems Interconnection—Basic Reference Model (OSI, Open System Interconnection)".

Figure 2:
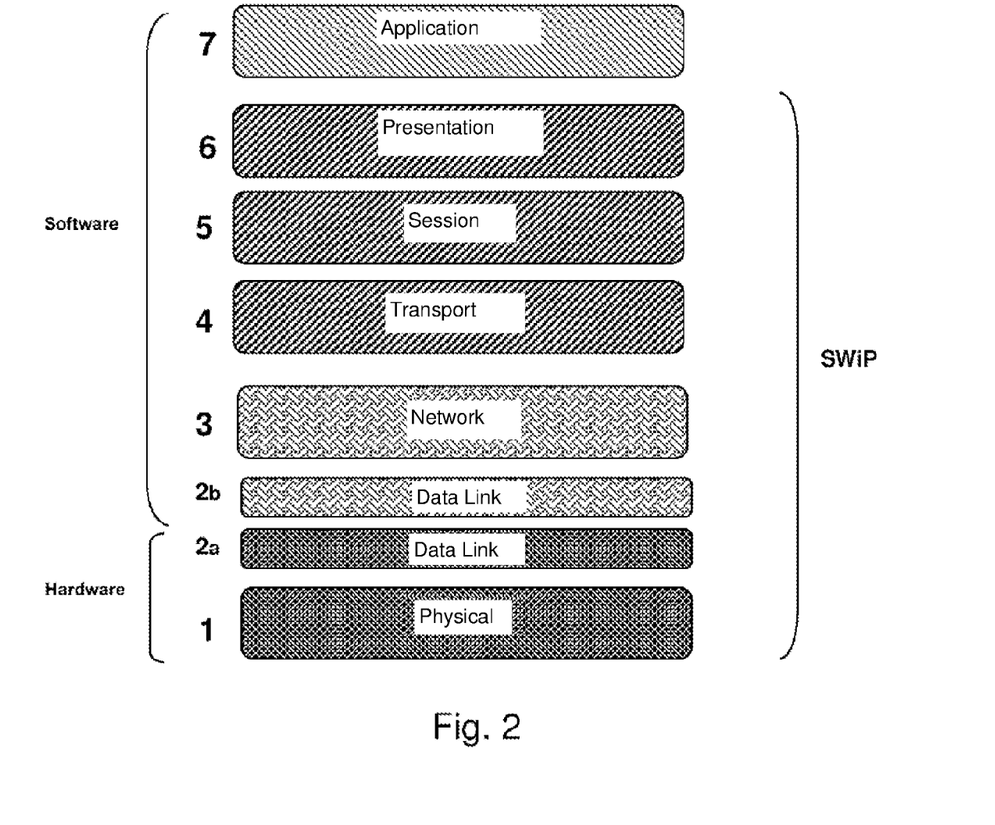
FIG. 2 is a diagrammatic illustration of a protocol of the state of the art.

This model is based on 7 layers, illustrated in FIG. 2.

This general architecture makes it possible to describe all of the types of protocols.

The described layers generally have the following functions:

An Application layer, which is not part of the protocol. This is the application of the system.

Two Session and Presentation layers, which are the interfacing layers of the protocol with the application.

The Presentation layer adapts the form of the data between the application and the protocol.

The Session layer makes it possible to manage virtual circuits with different modules of the application and presents a single interface with the protocol.

The Transport layer ensures the end-to-end transport between the sender and the recipient independently of the number of intermediate hops done by the routing.

The Network layer manages the transmission path for the intermediate hops. It manages the routing of the transmissions of the network and the hop-to-hop acknowledgments.

The Data Link layer manages the access to the media and ensures that the transmission has been done without any error between a sender and a recipient through error detection mechanisms.

The Physical layer, which is the hardware layer, and manages the transmission of bits on the media.

Protocols like ZigBee are designed to allow a variable and unknown number of pieces of equipment to transmit data randomly with transmission acknowledgments and making hops through the network.

The priority characteristics in this case are to limit the energy consumption of the pieces of equipment and to find a path to convey the data from the sender to the final recipient. The reduction of the transmission time frame is not the priority objective.

The protocol according to the invention makes it possible to quickly send a message with a fixed size between a limited and known number of equipment items, all without acknowledging transmission because the message is repeated cyclically.

It is logically deduced from this that there is no actual handling of the Transport layer.

Figure 3:
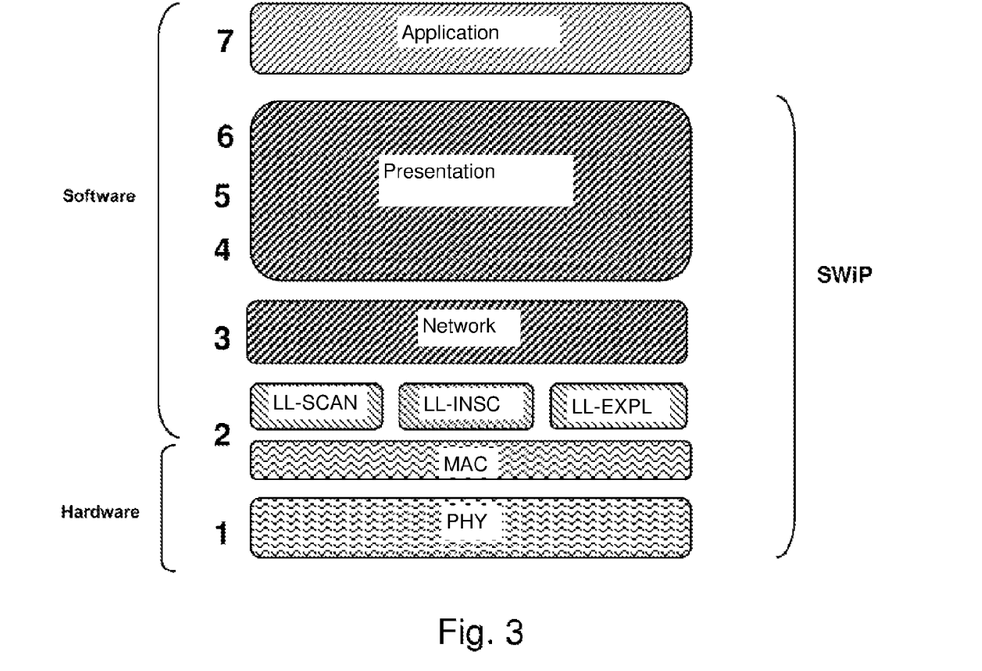
FIG. 3 is a diagrammatic illustration of the protocol according to the invention.

FIG. 3 illustrates a depiction according to an Open System Interconnection (OSI) model of a protocol according to the invention.

The physical layer (PHY) is responsible for the actual transmission of the electric signals on the communication medium. It is responsible for the transmission and reception of data bits. Its service consists of ensuring that a bit provided by the mac layer of the transmitter will be transmitted correctly to the mac layer of the receiver.

It ensures the synchronization at the bit level by adding a preamble made up of a predefined sequence of bits and at the frame level by a synchronization word defined by an IEEE 802 standard.

The physical layer is made by a hardware component depending on the communication support and, in the case at hand, the selected frequency band.

The criteria for choosing the frequency band are as follows:
  The choice will preferably pertain to an ISM (Industrial, Scientific and Medical) band, whereof the use of frequencies is free without a license.
  The lifting equipment having to be able to be used on all continents, the chosen band will be a band authorized by the various regulating authorities (ETSI for Europe, FCC for the United States, etc.).
  The frequency band will preferably allow the use of several channels.
  The actual throughput per channel will be high in order to convey urgent information quickly.
  The choice of the bands must allow the availability of components, transmitters/receivers, that are inexpensive.

One possible network made up of columns is a WPAN (Wireless Personal Area Network) corresponding to standard 802.15.4.

One preferred band is that from 2.4 to 2.5 GHz that meets all of the above criteria. This band comprises 16 channels numbered from 11 to 26. Based on the regulations, some channels may be prohibited or the transmission power may be limited. These limitations will be treated as parameters by the protocol according to the invention.

It is for example possible to use the transceiver module by the company Microchip. The MRF24J40 incorporates layers 1 and 2 (PHY and MAC) from standard 802.15.4 and allows a very extended configuration of the operating modes of the component.

Figure 4:
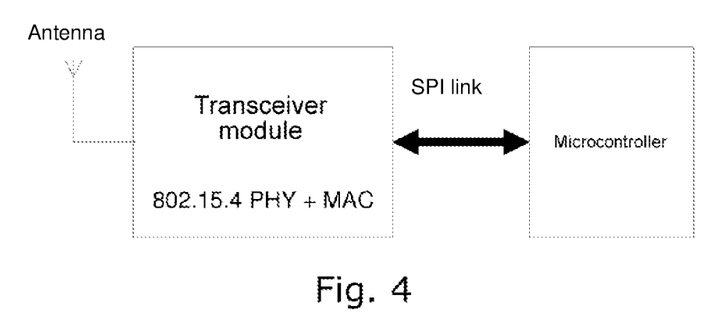
FIG. 4 is a diagrammatic illustration of a diagram of a transceiver module able be used to implement the invention.

The interfacing with the host microcontroller can be done by a SPI bus, as illustrated in FIG. 4.

Figure 5:
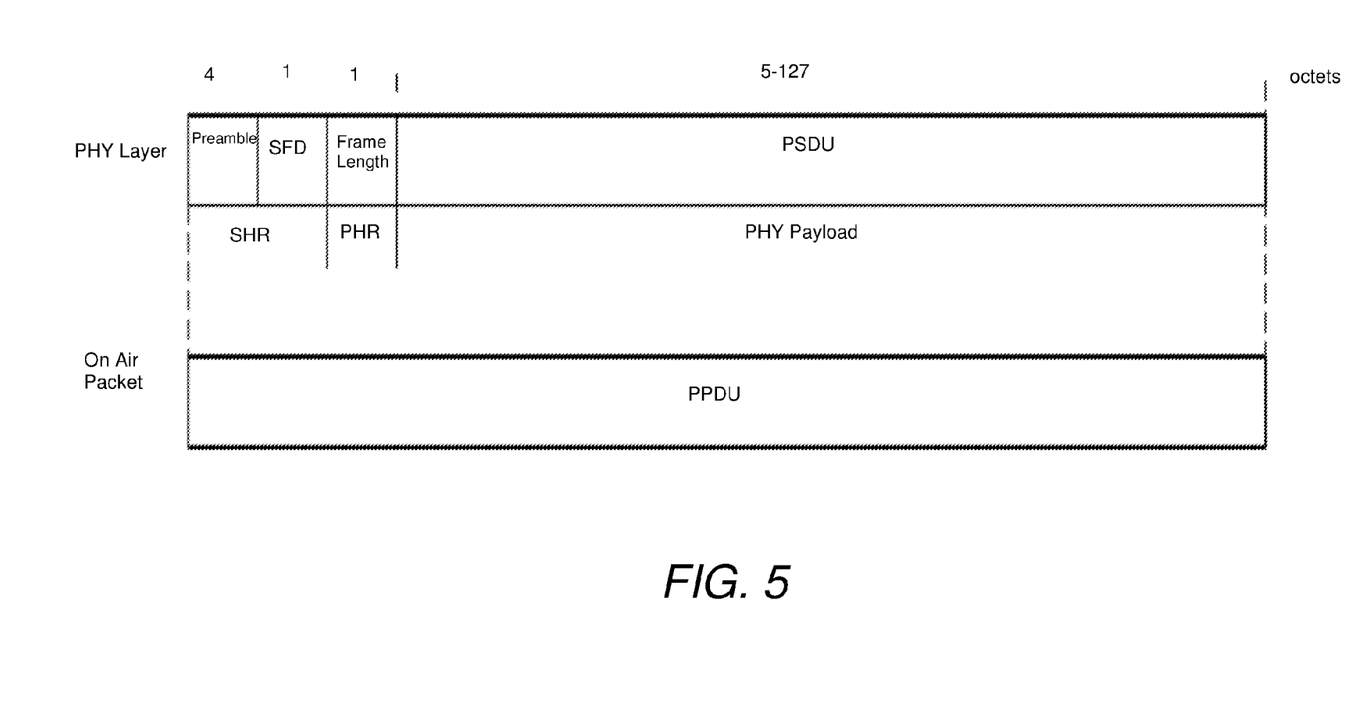
FIG. 5 is a diagrammatic illustration of a frame generated by the module of FIG. 4.

The format of the frame generated by the physical layer of the module corresponds to standard 802.15.4, and is illustrated in FIG. 5.

The functions of the MAC layer are:
1. The measurement of the RSSI (Received Signal Strength Indication) level and the LQI (Level Quality Indicator) signal on each transmission.
2. The composition of the frames for layer 1.
3. The CRC (Cyclic Redundancy Check) of errors in the transmission of a frame.
4. The management of the addressing of the frames.
5. The management of the network access method.

The MAC layer is handled by the hardware.

The chosen MRF24J40M module respects the specifications of standard 802.15.4 for the MAC layer. This standard describes the functionalities that are the bases of the mesh network protocols using the CSMA (Carrier Sense Multiple Access) or Beacon access modes.

The noise level can be measured on a channel by a request from the software of the mac layer. An automatic measurement is also done each time a frame is received. The obtained value is proportional to the level in dBm (0 dBm=1 mW on 50Ω) of the measured signal.

The quality level is measured each time data is received. The LQI is escalated to the upper layer with the data. The LQI value is the result of a calculation incorporating the RSSI level and the signal-to-noise ratio (SNR) level.

Figure 6:
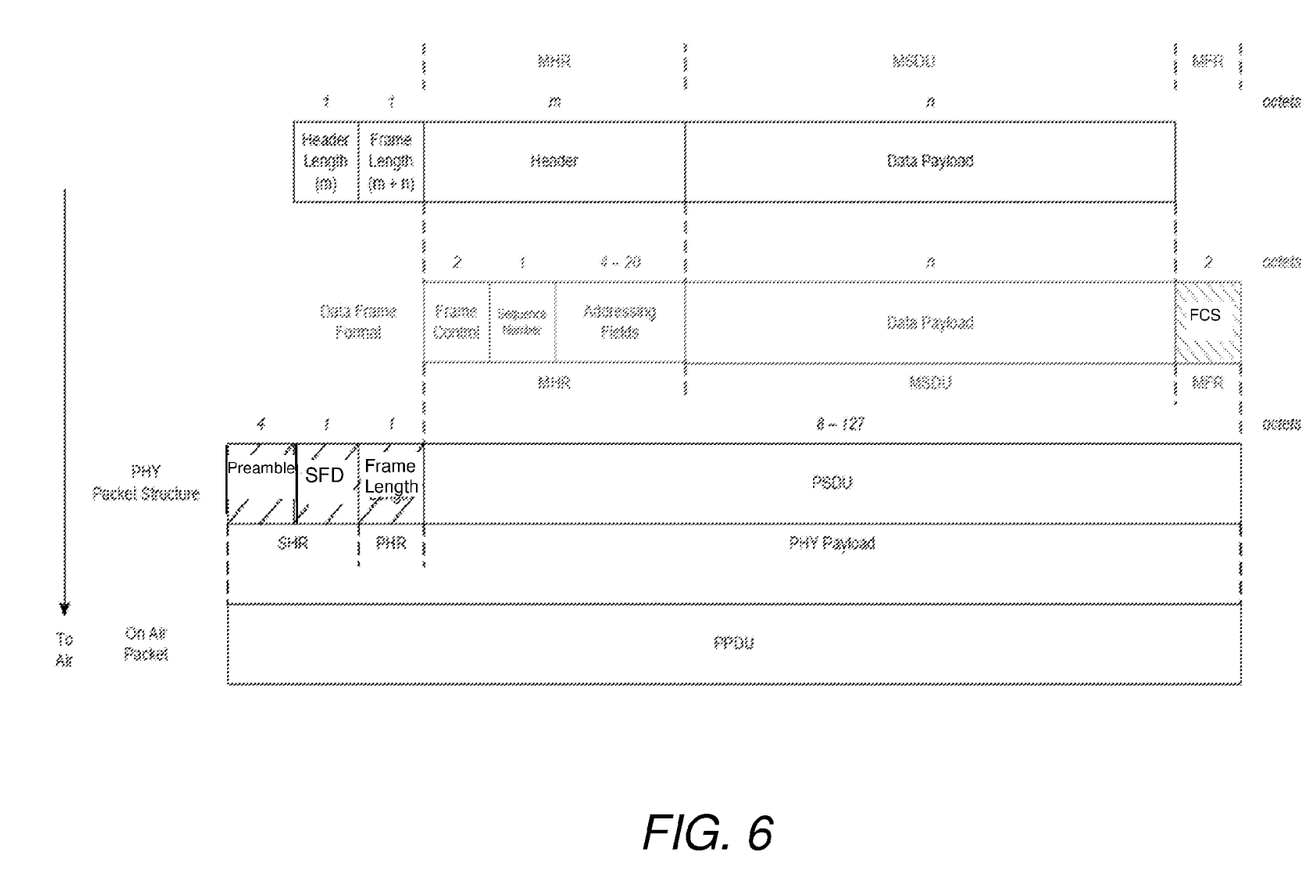
FIG. 6 is a diagrammatic illustration showing the encapsulation of the data transmitted by the radio module according to standard 802.15.4.

Data Transmission:

The data provided by the Network layer (MSDU, Mac Service Data Unit) is encapsulated before being transferred toward the physical layer. The redundant data from the CRC (FCS, Frame Check Sequence) is added to the frame by the mac layer so that the mac layer of the receiver can verify the validity of the data (FIG. 6).

The mac layer adds the MHR header to the data, as well as the size of the MHR and MSDU blocks.

Data Reception:

The hardware layer escalates, with the data, the FCS check field as well as the RSSI level and the LQI quality of the signal.

Figure 7:
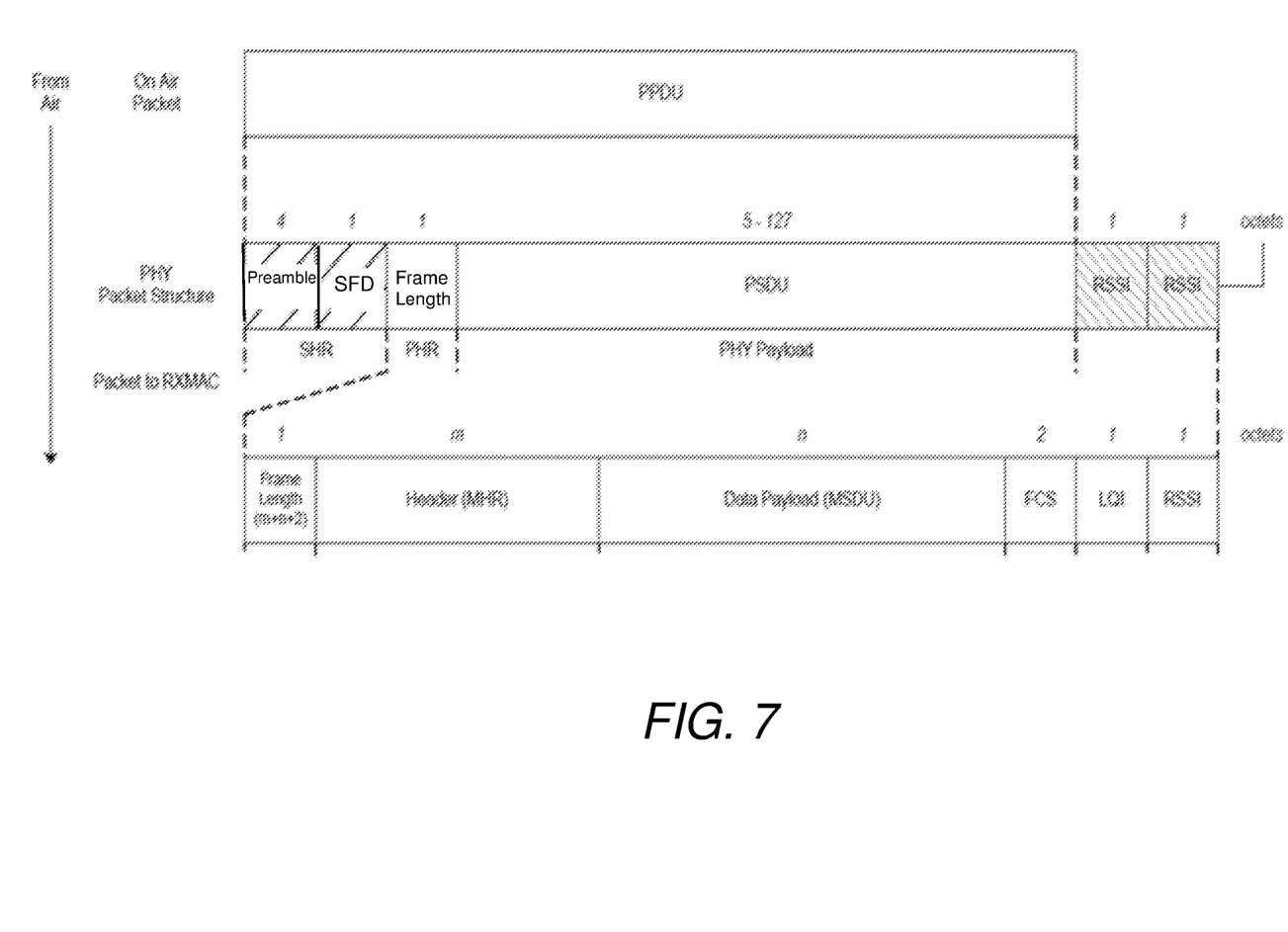
FIG. 7 is a diagrammatic illustration showing the extraction of data received by the radio module according to standard 802.15.4.

The software layer will only receive the data if the CRC check (FCS) is correct (see FIG. 7).

The transmission of the frames is done in "broadcast" mode; there is no specific addressing of a column. The frames are not acknowledged because they are retransmitted upon each cycle, therefore the address of the 802.15.4 sender of the frames is not important.

The CSMA-CA (Collision Avoidance) media access method or "Beacon" mode with slots managed by the coordinating equipment corresponds to standard 802.15.4.

It is also possible to completely control access to the media by deactivating the CSMA-CA in non-beacon mode.

The LL-SCAN module is active during the standby phase of the column.

During this phase, the device according to the invention scans all of the authorized channels by measuring the RSSI level of each channel. It also listens to the transmissions to identify the frames circulating on each channel.

The device according to the invention can thus detect the channels on which a bridge is being formed or operated and the quality of each channel not used by the device according to the invention so as to be able to choose the best channel for the other states of the protocol.

There is no transmission in this state, just listening.

This state is created upon powering on the column. It is kept until the selection of the column for the formation of the bridge.

LL-SCAN independently manages this phase and completes the channel state table.

Example of a series of measurements done with the MRF24J40 component.

Figure 8:
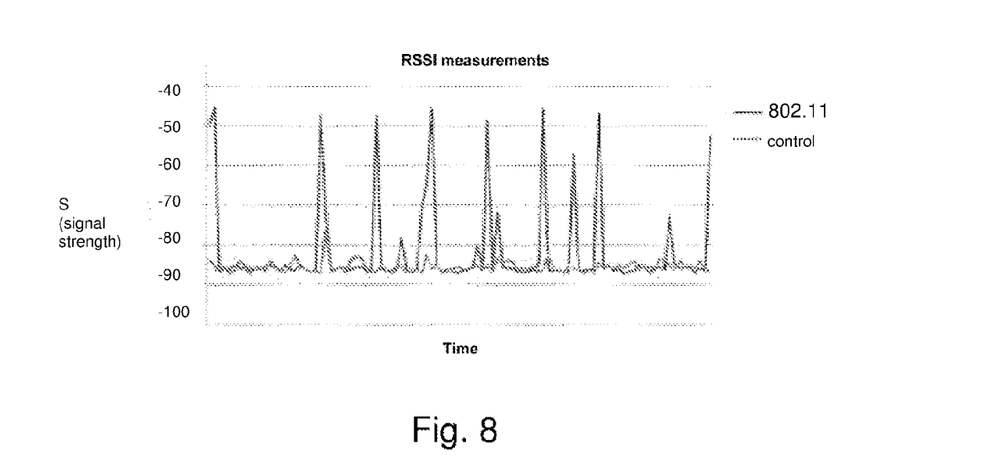
FIG. 8 is a graph illustration of an example of measurements read by the module of FIG. 4.

The availability of the channel is assessed, by the average of the measurement values (−90 dBm to 35 dBm) of the noise level and by an occupancy rate of the channel (comprised between 0 and 100%) relative to a threshold −60 dBm, over a period of 25 measurements. The results of the measurements corresponding to the graphs of FIG. 8 yield 7% for the free channel and 26% for the channel occupied by the frames according to the IEEE 802.11 standards. The sole purpose of this value is to be able to comparatively assess the occupancy of the channels in a simple manner.

The assessment of the occupancy rate lasts about 500 ms for the 16 channels.

The assessment is done all of the channels marked as being authorized by the local regulations.

If the transmission by the device according to the invention is detected on the channel, LL-SCAN stores the type of frame (registration frame or operating frame), the serial number of the column that created the bridge and the number of the key that was used to create the bridge. The table is updated upon each measurement cycle.

Example structure of the channel table:
For each channel:

| Label | Size in bytes | Possible values |
| --- | --- | --- |
| Authorized | 1 | 0 = Prohibited, 1 = Authorized |
| State | 1 | 'I' = Registration, 'E' = Operation, 0 = Free |
| Key number | 4 | Serial number of the key |
| Column number | 4 | Serial number of the column |
| Noise level | 1 | RSSI (0 to 255) |
| Occupancy rate | 1 | % Occupancy of the channel 0 to 100% |

This table will be used by LL-INSC in the bridge forming phase.

The LL-INSC layer is activated by the network layer upon selection of the column with the key. The activation of LL-INSC causes the deactivation of LL-SCAN.

The LL-INSC layer searches in the channel table to determine whether a channel is already in the registration phase with the same key:

If so, LL-INSC will rejoin this channel to register the column.

If not, LL-INSC will choose the channel having the lowest occupancy rate and RSSI level and create the registration dialog on this channel.

Description of the Registration Protocol

The column registration dialog is based on the TDMA (Time Division Multiple Access) protocol with 8 slots. The advantage of the TDMA protocol is that it is completely deterministic and optimizes the response time by eliminating collisions and optimizing the throughput on the channel.

The slots are defined by the LL-INSC layer of the column having created the dialogue that assigns itself 0 as column number of the bridge. The number of the column of the bridge corresponds to the slot number (from 0 to 7) in the protocol.

Each column presenting itself on the channel assigns itself the 1st available slot number and inserts its data into the corresponding slot. The available slot number is indicated in the data field of column 0.

During this phase, the columns insert their presence frames cyclically each time slots are launched by column 0. The frames are escalated to the network layer during this phase.

The disappearance of this presence frame, for a column from 1 to 7, for N consecutive cycles is treated as the deregistration of the column and the release of the corresponding slot.

The absence of dialogue of column 0 during a duration corresponding to N*8*T ms, T being able to assume a value typically comprised between 3 and 10 ms, causes the elimination of the bridge and the de facto deregistration of all of the columns. The channel is freed and the channel table of each column and the information is escalated to the network layer, which gives control back to LL-INSC.

Figure 9:
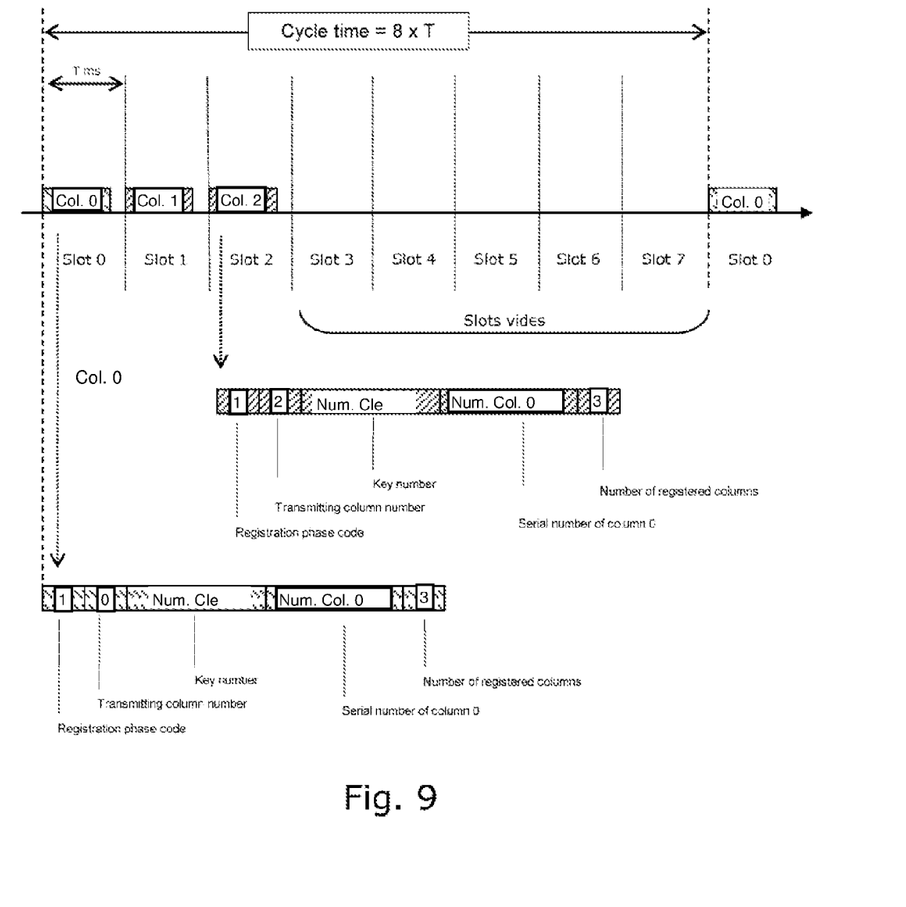
FIG. 9 is a diagrammatic illustration of an example of encoding by column.
Figure 10:
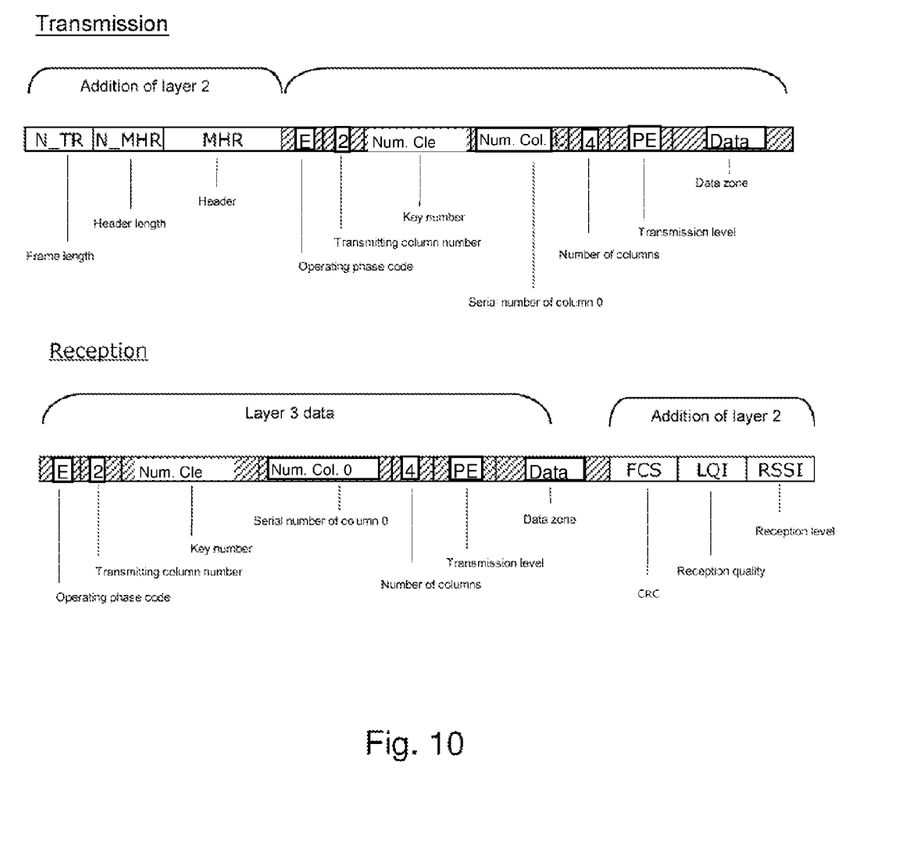
FIG. 10 is a diagrammatic illustration of an example of taking exchanges between columns into account.

FIG. 9 illustrates the format of the dialogue.

The additional functions for collecting level and quality information as well as the automatic adjustment of the transmitted power are activated in the network layer and described below.

The LL-EXPL layer is activated by the network layer during the activation of the column with the key. The activation of LL-EXPL causes the deactivation of the LL-INSC layer.

The operating dialogue of the columns is based on a protocol according to the invention with n slots. Like the TDMA protocol used during the registration phase, this involves a protocol with slots with a concentration assigned to the columns. The advantage of the protocol according to the invention is that it eliminates the special role of column 0. Each column hands control to the following column (token passage). All of the columns manage the time delays of the slots in order to respect the cycle if no frame is received from a column. In case of failure of column N, column N+1 will enter the transmission mode upon expiration of the monitoring time delay.

In a way, each column becomes master in turn. In a master/slave operation, the master is perfectly able to detect the failure of a slave, but the failure of the master is not detected. By changing masters, the failure of the master will be detected once the following column has become master. According to one particular embodiment of the invention, two separate columns are master in turn, with a change of master approximately every 7.5 ms. This change period is such that a stop delay due to the failure of the master for 7.5 ms remains acceptable for the safety of the bridge. The likelihood of an unmanaged failure is thus very significantly reduced: the likelihood of two columns, masters in turn, failing at the same time is much lower than that of a master column failing.

According to one preferred embodiment of the invention, all of the columns become master in turn, thus, as long as one of the columns has not failed, within a maximum time frame of N×7.5 ms, it will be master and will detect the failures of the other columns. If all of the columns fail at the same moment, they stop in any case, and the bridge stops in a stable situation. Safety is therefore maximal.

The duration of 7.5 ms is one example of an appropriate value, but values such as 3 ms or 10 ms can also be used.

In this type of token TDMA protocol with broadcast transmission, each column monitors the transmissions of the other columns. The failure of one column will be detected by all of the other columns and will cause the lifting to stop in a stable situation after N detected consecutive faults. Safety is therefore maximal.

Like for the LL-INSC protocol, the advantage of the protocol according to the invention is being able to be completely deterministic and optimize the response time by eliminating collisions and optimizing the throughput on the channel, even in case of transmission fault by any column.

The allocations of slots done by the LL-INSC protocol are kept and the timings are identical.

The empty slots are eliminated, since the addition of columns is now prohibited. The cycle time is therefore reduced as a function of the number of columns used.

FIG. 9 illustrates the format of the obtained frames.

The network layer receives information from the MAC layer. It extracts the quality and level information of the signal therefrom and processes it, and transfers the useful data to the presentation layer. The network layer does not perform any processing on the useful data.

Upon receiving a frame, the hardware MAC layer adds the RSSI level and the quality level for this reception.

The network layer stores all of this information in a table and deduces a global quality indicator GQI therefrom, which it escalates to the presentation layer so that the application can process this information.

Each column indicates its transmission level in its transmitted frame. The receiving columns receive, in addition to these data, the level with which the frame was received. Each column can therefore calculate the attenuation of the signal between it and the transmitting column.

In order to make it possible to have two bridges coexist on the same channel, if needed, the power must be just enough with no excess for an acceptable link quality. The network layer adjusts the transmission power to obtain a minimum level for the link having the greatest attenuation. This processing is done throughout the entire duration of the operating phase.

The role of the presentation layer is to shape the data coming from and to the application.

For reception, the protocol according to the invention sends three pieces of information to the application layer. This information is deposited in global memory locations.

The information is:
The state of the protocol (1 byte)=Status_SWiP, which assumes the following values:
0=Inactive Protocol
'S'=Scanning Phase
'I'=Registration Phase
'E'=Operating Phase
'D'=Radio failure
The global quality indicator=IQG_SWiP, which assumes values 0 to 4 (4 being the maximum quality)
The useful data extracted from the received frames=DATA_REC_SWiP, made up of:
Length (1 byte)
Data (maximum 80 bytes)

For transmission, the data received from the application is:
The activation of the phases of the protocol according to the invention by the application (1 byte), which may assume the following values:
0=Protocol stopped
'S'=Activation of the Scanning phase
'I'=Activation of the Registration phase
'E'=Activation of the Operating phase
The useful data for the application, made up of:
Length (1 byte)
Data (maximum 80 bytes)

The protocol according to the invention differs from the known protocols by the use of TDMA mechanisms with control passage, which give it high performance levels in terms of throughput and conveyance time frame.

The protocol according to the invention is a simple and robust protocol with no needless routing functions for the vehicle bridge application type.

The protocol according to the invention is completely deterministic and appropriate for transmitting urgent information.

One advantage of this protocol is that owing to its very highly deterministic nature and its very short transmission time frames, it allows the performance of regulation automatisms in a closed loop.

I claim:

1. A radio communication method between a plurality of columns, the method comprising the steps of:
providing said plurality of columns in communication by a multichannel mode comprised of a plurality radio channels, each column being cooperative with at least one other column so as to form a bridge, each column having an operating mode selected from a group consisting of a lifting mode and a stop mode, wherein each column has a respective operating mode selected in a predetermined frequency band of said plurality of radio channels;
powering on each column;
scanning transmissions of said radio channels by each column so as to detect available channels, occupied channels, and scrambled channels;
selecting a first column for said bridge by assignment of an entry key by an operator;
selecting a free channel selected from said available channels;
forming a beacon channel with said free channel, said operator managing said beacon channel to register at least one other column, said at least one other column having said entry, said beacon channel broadcasting to said plurality of columns;
registering said first column, said at least one other column, and any other columns having said entry key so as to determine bridge columns corresponding to said bridge;
closing the step of registering, said beacon channel forming an operational channel for said bridge columns;
dialoging between each bridge column on said operational channel so as to synchronize respective operating modes of said bridge columns; and
forming said bridge,
wherein said first column, said at least one other column N, and said any other columns having said entry key being registered in time slots chronologically,
wherein any bridge column, selected from a group consisting of said at least one other column and said any other column, initiates the step of closing the step of registering, and
wherein any bridge column, selected from a group consisting of said at least one other column and said any other column, sets the operating modes of said bridge columns during the step of forming said bridge.

2. The radio communication method, according to claim 1, wherein said radio channels have a frequency band between 2.4 and 2.5 GHz.

3. A radio communication method between a plurality of columns, the method comprising the steps of:
providing said plurality of columns in communication by a multichannel mode comprised of a plurality radio channels, each column being cooperative with at least one other column so as to form a bridge, each column having an operating mode selected from a group consisting of a lifting mode and a stop mode, wherein each column has a respective operating mode selected in a predetermined frequency band of said plurality of radio channels;
powering on each column;
scanning transmissions of said radio channels by each column so as to detect available channels, occupied channels, and scrambled channels;
selecting a first column for said bridge by assignment of an entry key by an operator;
selecting a free channel selected from said available channels;
forming a beacon channel with said free channel, said operator managing said beacon channel to register at least one other column, said at least one other column having said entry key, said beacon channel broadcasting to said plurality of columns;

registering said first column, said at least one other column N, and any other columns having said entry key so as to determine bridge columns corresponding to said bridge;

closing the step of registering, said beacon channel forming an operational channel for said bridge columns;

dialoging between each bridge column on said operational channel so as to synchronize respective operating modes of said bridge columns; and forming said bridge, wherein said first column, said at least one other column, and said any other columns having said entry key being registered in time slots chronologically, wherein any bridge column initiates the step of closing the step of registering, and wherein any bridge column sets the operating modes of said bridge columns during the step of forming said bridge; and installing an open systems interconnection protocol being comprised of a physical layer as a layer 1, a data link layer as a layer 2, a network layer as a layer 3, a transport layer as a layer 4, a session layer as a layer 5, a presentation layer as a layer 6, and an application layer as a layer 7, wherein said transport layer, said session layer, and said presentation layer are grouped together in a single presentation layer between said network layer and said application layer, said single presentation layer shaping data for the steps of scanning transmissions, selecting said first column, selecting said free channel, forming said beacon channel, registering said first column, closing the step of registering, dialoguing between each bridge column, and forming said bridge.

4. The radio communication method between columns of a lift according to claim 3, wherein said data link layer is comprised of a control sublayer of a logic link comprising three separately active modules, the three modules being comprised of a first module corresponding to phases for channel scanning for the step of scanning transmissions, a second module corresponding to registration for the step of registering said first column and the step of closing the step of registering, and a third module corresponding to the step of forming said bridge.

5. The radio communication method between columns of a lift according to claim 4, wherein the step of scanning transmissions comprises said first module performing a measurement of receiving power of signals received from each radio channel of said plurality of radio channels, identifying frames sent on each radio channel, and filling in a channel state table, after the step of powering on each column.

6. The radio communication method, according to claim 5, wherein said channel state table comprises:

data corresponding to a possibility of using each radio channel based on local regulation and being stored as authorized or prohibited;

data corresponding to a type of transmitted frame and being stored as a registration frame or an operation frame of said bridge;

data corresponding to a serial number of a respective entry key assigned to each bridge on each radio channel;

data corresponding to a serial number of each respective column; and data corresponding to an occupancy rate of each radio channel, said occupancy rate being comprised of a percentage calculated after several tens of measurements.

7. The radio communication method between columns of a lift according to claim 4, wherein the step of registering said first column and the step of closing the step of registering comprises said second module deactivating said first module, determining whether the step of registering said first column is on a particular radio channel with said entry key, joining said particular radio channel so to register a particular column corresponding to said particular radio channel, when said particular radio channel with said entry key matches, and choosing a channel having a lowest occupancy rate as said beacon channel for broadcasting on said beacon channel.

8. The radio communication method between columns of a lift according to claim 7, wherein the step of registering said first column is based on a completing a time division multiple access, being comprised of time slots with a predetermined duration, and wherein the step of registering said first column further comprises:

assigning a number 0 to said first column and subsequent numbers in order of arrival to said at least one other column, and any other columns;

inserting data corresponding to said first column, said at least one other column, and any other columns into said time slots corresponding to said number and said subsequent numbers, wherein said time division multiple access is comprised of a data field of said first column corresponding to a number of available time slots;

inserting presence frames of said first column, said at least one other column, and any other columns cyclically upon each launch of said time slots according to said first column, said presence frames being transmitted to said network layer.

9. The radio communication method between columns of a lift according to claim 8, further comprising the step of: detecting a disappearance of a particular presence frame of said first column for consecutive cycles, said at least one other column, and any other columns; removing said first column, said at least one other column, and any other columns corresponding to said particular presence frame as a deregistration; and releasing a respective time slot corresponding to said particular presence frame.

10. The radio communication method between columns of a lift according to claim 8, further comprising the step of: detecting an absence of transmission by any bridge column for a duration of cycles, removing all bridge columns from the step of registering said first column so as to eliminate said bridge as a deregistration of all bridge columns, and releasing said operational channel, information correspond to the step of detecting said absence, removing all bridge columns, and releasing said operational channel being transmitted to said network layer.

11. The radio communication method, according to claim 8, wherein each presence frame comprises a code for the step of registering said first column, a number of each column, a number of said entry key assigned to said bridge, a serial number of said first column, a number of said bridge columns recorded, and a table of quality indicators containing data on power and receiving quality of signals received from each bridge column.

12. The radio communication method, according to claim 4, wherein the step of registering said first column and the step of closing the step of registering comprises said third module, being activated by said network layer when said first column, said at least one other column, and any other columns are registered as said bridge columns, deactivating said second module, and managing said bridge columns on a time division multiple access basis, wherein a token passes control from any one bridge column to any other bridge column upon each cycle, wherein each bridge column manages a duration of time slots according to an operating data frame of each bridge column, wherein assignments of each duration of time slots are stored, and wherein unused time slots are deleted.

13. The radio communication method, according to claim 12, wherein said another other column transmits, when said any one bridge column fails upon expiration of a duration of time slots corresponding to said any one bridge column.

14. The radio communication method between columns of a lift according to claim 12, wherein each operating data frame comprises a code for the step of registering said first column, a number corresponding to each bridge column when transmitting, a number of said entry key assigned to said bridge, a serial number of said first column, a number of said bridge columns, a table of quality indicators, and operational data.

15. The radio communication method, according to claim 11, wherein each network layer of a respective bridge column stores a table of quality indicators of said each presence frame and calculates a global quality index of reception and a quality indicator of reception corresponding to each presence frame relative to all presence frames.

16. The radio communication method, according to claim 15, wherein each network layer calculates a transmission power according to a determined level by a bridge column with a lowest quality indicator of said bridge columns.

17. The radio communication method, according to claim 3, wherein data communicated between said single presentation layer and said application layer comprises:
- data correspond to a byte indicating a status of a respective bridge column, and being transmitted as inactive/stop, scanning/scanning command, registration/registration command, operation/operation command, and radio failure for reception only;
- data corresponding to a global quality indicator and coded between 0 and 4; and
- data corresponding to a length of a respective presence frame and data of said respective presence frame.

18. The radio communication method, according to claim 17, wherein time slots last 1.5 ms for each presence frame, each presence frame having a duration less than 1 ms.

19. A lift, comprising:
- said first column and said at least one other column, according to said method of claim 1; and
- a radio communication means between said first column and said at least one other column.

* * * * *